United States Patent [19]

Jewell

[11] Patent Number: 5,162,740
[45] Date of Patent: Nov. 10, 1992

[54] ELECTRODE ARRAY CONSTRUCTION FEATURING CURRENT EMITTING ELECTRODES AND RESISTIVE SHEET GUARD ELECTRODE FOR INVESTIGATING FORMATIONS ALONG A BOREHOLE

[75] Inventor: Andrew D. Jewell, Bracknell, United Kingdom

[73] Assignee: Halliburton Logging Services, Inc., Houston, Tex.

[21] Appl. No.: 713,476

[22] Filed: Jun. 11, 1991

[30] Foreign Application Priority Data

Mar. 21, 1991 [GB] United Kingdom ............... 9105994

[51] Int. Cl.⁵ .................... G01V 3/20; G01R 27/00; G01R 27/22
[52] U.S. Cl. .................... 324/347; 324/355; 324/367; 324/713; 324/715
[58] Field of Search .............. 324/347, 351, 354, 355, 324/357, 366, 367, 373–375, 693, 694, 696, 713, 715, 717, 724; 73/153, 861.08

[56] References Cited

U.S. PATENT DOCUMENTS

| | | | |
|---|---|---|---|
| 3,487,303 | 12/1969 | Remington | 324/705 |
| 4,468,623 | 8/1984 | Gianzero et al. | 324/355 X |
| 4,567,759 | 2/1986 | Ekstrom et al. | 324/355 X |

*Primary Examiner*—Gerard R. Strecker
*Attorney, Agent, or Firm*—William J. Beard

[57] ABSTRACT

An electrode for use in the electrical investigation of a medium such as a borehole wall, comprises a sheet (32) of electrically resistive material having opposed first (34) and second (33) surfaces, one or more elongate electrical conductors (35,36) of low resistivity, an end face of each conductor abutting the first surface of the sheet (32) and means for sensing electric current passing through each conductor. In use, the second surface (33) of the sheet (32) is exposed to the medium to be investigated.

18 Claims, 1 Drawing Sheet

FIG.1
FIG.2
FIG.3
FIG.4
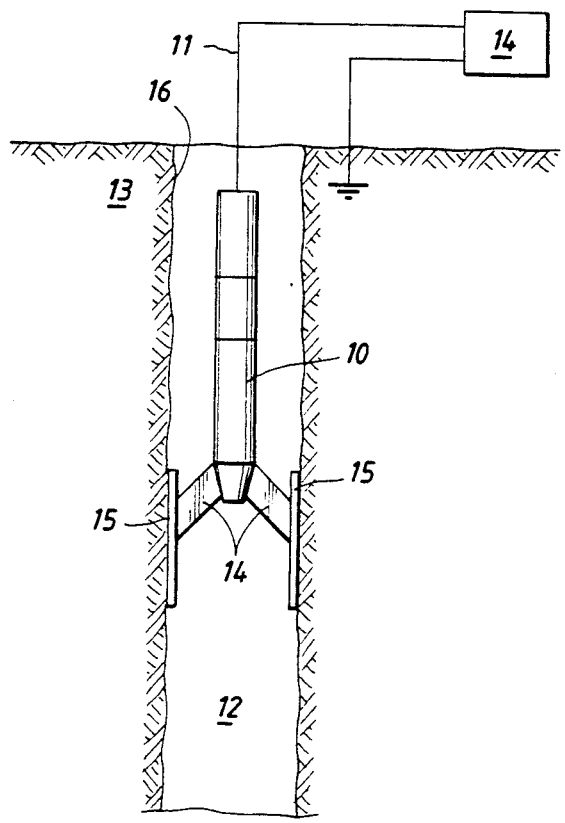
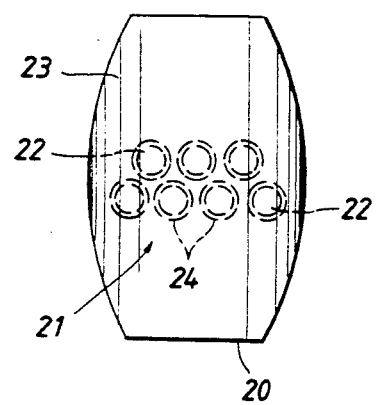
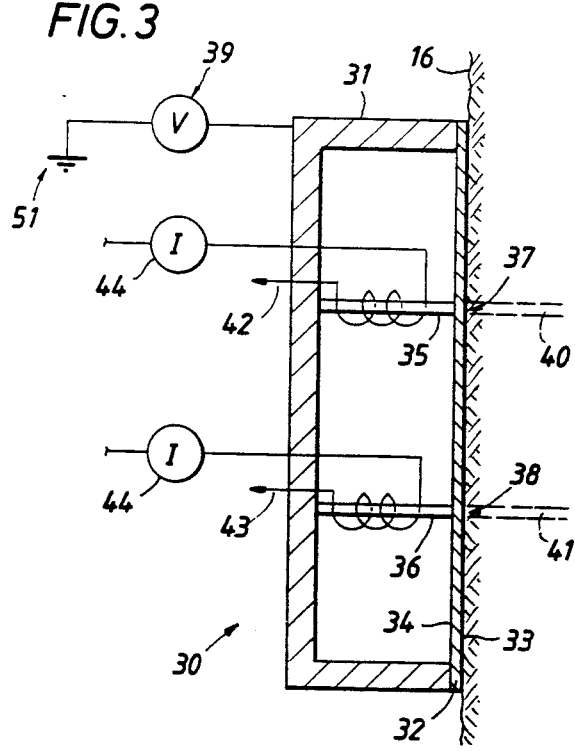
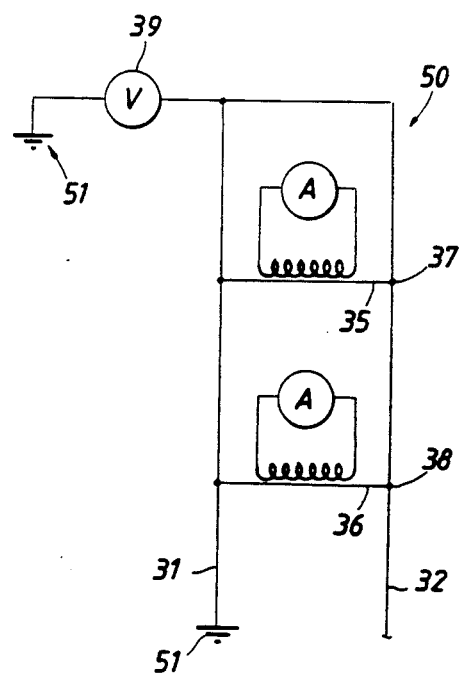

ELECTRODE ARRAY CONSTRUCTION FEATURING CURRENT EMITTING ELECTRODES AND RESISTIVE SHEET GUARD ELECTRODE FOR INVESTIGATING FORMATIONS ALONG A BOREHOLE

BACKGROUND OF THE INVENTION

1. Field of the Invention

This invention relates generally to apparatus for electrically investigating a medium, and particularly but not exclusively to such apparatus for electrical investigation of a borehole penetrating an earth formation.

2. Description of Prior Art

Electrical borehole logging is well known and various devices and techniques have been described. In U.S. Pat. Specification No. 4,468,623, a tool and technique are described for making fine detailed resistivity investigations from which a fine display can be formed in a manner such as that shown and described in U.S. Pat. Specification No. 4,567,759. The tool has a plurality of pads to be pressed against the borehole wall. Each pad carries an array of small electrodes embedded in a conductive pad surface, and measurements of current from the electrodes are recorded in order to detect resistivity anomalies indicative of thin fractures in the earth formation and the stratigraphy of the borehole wall. The conductive pad surface and the electrodes are electrically energised at substantially the same potential. The measure electrodes are electrically insulated from the conductive pad surface with thin insulators and are mounted flush on each pad, providing a plane for contact with the medium to be measured, the plane being maintained at a nearly uniform potential.

Whilst apparatus of this type can be operated satisfactorily in practice, the construction of the pads with arrays of embedded, insulated electrodes is complex and costly. Moreover the ideal concept of a continuous voltage plane is never achieved by such a construction due to discontinuities across the surface caused by the discrete insulated areas.

SUMMARY OF THE INVENTION

I have now devised a new electrode construction which mitigates certain of the disadvantages associated with the known arrangements.

According to the present invention, there is provided apparatus for electrically investigating a medium, which comprises a sheet of electrically resistive material having first and second opposed surfaces, one or more elongate electrical conductors of a lower electrically resistive material, an end face of each conductor abutting said first surface of said sheet in electrical contact therewith, and means for sensing electric current passing through each conductor; and wherein said second surface of said sheet is exposable to the medium to be investigated. In the apparatus of the present invention, each elongate electrode is butted at one end against the first surface of an electrically conductive sheet. The electrode is more conductive than the sheet, preferably at least ten times more conductive. In use, the sheet is maintained at the same electrical potential as the electrodes. The sheet thus forms a substantially continuous voltage plane. The second (outer) surface of the sheet is exposed to the medium to be investigated, eg. a borehole wall or a fluid. The points at which the electrodes abut the first surface of the sheet form electrode points on the second surface of the sheet, these notional electrode points being surrounded by the sheet continuum which acts as a guard electrode, thus closely focussing current flow into the medium from each electrode point. By sensing the current flow in each electrode, information about the electrical conductivity of the medium and its spatial variation can be obtained.

Whilst a most important use of the apparatus of the invention is in borehole logging (and this will be described in more detail hereafter), the apparatus also has other uses. For example, it can be used to investigate the electrical conductivity of various media. In the case of fluids which are flowing relative to the second surface of the sheet, information can be obtained about the fluid flow. An example of this use of the apparatus is the subject of our copending British application entitled Device for Sensing Fluid Behaviour filed on even date herewith and bearing Ser. No. 9105994.9. The apparatus also be used to investigate solid media other than in boreholes, and the skilled practitioner in this cut will appreciate that the apparatus has utility for various purposes both in the laboratory and in the field.

In the apparatus of the invention, it is preferred to have a plurality of said electrical conductors each fixed in endwise abutment to a point on said first surface of said sheet, the said points being spaced to form a regular array. By using an array of electrodes, it is possible simultaneously to ascertain electrical conductivity of a medium at a number of spaced locations.

It is an important feature of the present invention that the electrical conductivity of the electrode conductors be greater than, and preferably much greater than, that of the sheet. The sheet itself must be conductive (and not an insulator) since it functions importantly as a guard electrode. Among the preferred materials for the electrodes are highly conductive metals and alloys, most preferably copper (or silver or gold). The sheet material will be chosen not only in dependence on its electrical characteristics but also having in mind the intended use of the particular apparatus since the sheet is exposed to, and will usually contact, the medium under test. For most purposes, a metal or metal alloy sheet is best, and we prefer to use stainless steel or a titanium or titanium alloy. However, the invention is not limited to the use of metals: examples from among other materials which can be used are electrically conductive rubbers and plastics materials.

Usually, the sheet will be one wall of a housing enclosing the electrodes (or at least their areas of abutment to the first surface of the sheet). The electrodes will normally be in fixed abutment to the first surface. The means of attachment can vary widely, although it must not of course deleteriously affect the desired electrical characteristics. One means is, where possible, to solder the ends of the electrodes to the sheet surface, eg. copper electrodes abutting a stainless steel surface.

As stated previously, the invention is of particular utility in borehole logging. In accordance with this aspect of the invention, there is provided apparatus for investigating the wall of a borehole penetrating an earth formation, the apparatus being adapted to move along the borehole axis, comprising: a housing, one or more electrically energisable electrode conductors in the housing, means for sensing electric current passing through each electrode and into the borehole wall,- wherein the housing also comprises a continuous sheet of electrically conductive material which is interposed between the end face of each electrode and the borehole wall, and wherein the conductivity of each electrode is greater than that of the sheet material.

The downhole apparatus must be able to withstand high temperatures and pressure. Accordingly, we prefer the housing to be a closed container supporting and protecting the electrodes. The container can be empty, but preferably it includes a filling material which has a low coefficient of expansion and is stable under the downhole conditions. The material should also be one with which the housing can easily be filled. Oils are one suitable material, with an expansion device if necessary. However, there are other suitable materials including various resins and silicone rubbers.

The various preferred features described above for the apparatus of the invention apply also to the downhole apparatus mutatis mutandis. For downhole work, the sheet will normally be of metal and it will usually be in the form of a plate. Wear resistant strips can be provided in the outer surface as desired.

In the apparatus of the invention, means are provided to sense the current in the or each electrode. Various devices can be used for this purpose including a transformer. We prefer to provide for each electrode a toroidal coil, the coil being connected to a current measuring device. When using a multiplexer downhole, the toroids terminate to a low impedance to keep the impedance of the feeds low. The apparatus of the invention is usually operated using alternating current, eg. 2kHz sine wave. Other arrangements are possible, including the use of electrical pulses.

BRIEF DESCRIPTION OF THE DRAWINGS

In order that the invention may be more fully understood, reference is made to the accompanying drawings, wherein:

FIG. 1 illustrates schematically a known borehole investigating tool to which apparatus according to the present invention may be attached;

FIG. 2 shows a prior art array of measure electrodes on a conductive pad;

FIG. 3 illustrates in schematic cross-section one embodiment of apparatus in accordance with the present invention; and FIG. 4 is a diagram of an electrical circuit suitable for the apparatus of FIG. 3.

DESCRIPTION OF PREFERRED EMBODIMENTS

Referring first to FIG. 1, a known borehole investigating tool 10 is shown suspended from a cable 11 in a borehole 12 penetrating an earth formation 13. The tool may be supported within the borehole by any other suitable means and may be used to investigate vertical boreholes or boreholes oriented at any angle to the vertical. The support such as cable 11 is connected to surface located control equipment 14 which can process and record measurements made from tool 10. Surface equipment 14 is further provided with appropriate controls and power to drive electrical devices in tool 12 in a manner well known in this field.

Tool 10 has attached thereto apparatus 15 which is a device for investigating the wall 16 of the borehole; a number of such devices may be fitted circumferentially around the tool. Apparatus 15 is attached to the tool by a biasing means 17 which presses the face of apparatus 15 against the wall 16. The biasing means 17 may include springs or hydraulic actuators as are well known in the art.

In U.S. Pat. Specification No. 4468623 as previously mentioned, apparatus 15 comprises a pad 20 such as that shown in FIG. 2. An array 21 of measure electrodes 22 are mounted on the pad 20, the electrodes being mounted to lie flush with the outer surface 23 of the pad. The outer surface 23 is conductive and the electrodes are surrounded by insulators 24 which serve to isolate the electrodes from the conductive pad surface. A borehole investigation is made by introducing electrical survey currents from the array 21 of electrodes 22 into the borehole wall and monitoring the magnitude of the survey currents from each electrode. In operation, the electrical potentials of the electrodes and of the conductive surface 23 are substantially the same.

In accordance with an embodiment of the present invention, apparatus 15 comprises the device 30 shown in FIG. 3. The device is a focussed sensor, which may be used for investigating the characteristics of a variety of media. The sensor has a transducer housing 31 of stainless steel closed by a sheet 32 of resistive material (in this case also stainless steel) which provides a continuous transducer surface with an outer surface 33 in contact with the wall 16 of the borehole 13. Although the sheet 32 is composed of resistive material, and is in electrical as well as mechanical contact with the housing 31, the resistivity of the sheet material is much lower than that of the measured medium which is, in this embodiment, the material in the earth formation around the wall of the borehole. The sheet 32 may be curved in order to lie more readily against the borehole wall.

One or more low impedance conductors contact the interior surface 34 of the sheet 32. In FIG. 3, two such conductors 35 and 36 are shown which are soldered or spot welded to the inner surface 34 of sheet 32. The effective impedance of the resistive sheet 32 is much higher than that of the current feed conductors 35 and 36. The feed conductors 35 and 36 define two measure points 37 and 38, respectively, on the resistive sheet 32. The remainder of the sheet operates as a guard electrode, surrounding the measure points 37 and 38, defined by the feed conductors 35 and 36, which form current-sensing electrodes.

In practice, a voltage supply 39 applies potential to the housing 31, and therefore to the resistive sheet 32. The potential thus generated causes current to flow into the borehole wall. However, although there is a near uniform potential across the sheet 32, the low impedance current feeds 35 and 36 enable the measure points 37 and 38 to act as individual electrodes focussed in measuring regions 40 and 41, respectively, by the surrounding surface of the sheet 32. Consequently, current flowing into the borehole wall in these regions 40 and 41 may be sensed and measured by the corresponding current flow in the current feeds 35 and 36, respectively. Toroidal coils 42 and 43 are adjacent the current feeds 35 and 36, respectively, and provide circuit components which measure the current variation in the regions 40 and 41. Consequently, the coils 42 and 43 acting as low impedance transformers provide output signals from the measure points 37 and 38, such that the current in the current feeds can be read by meters 44 in the circuit of each toroidal coil.

FIG. 4 shows a circuit diagram 50 for the transducer 30 of FIG. 3. It will be appreciated that a closed loop circuit, including the measure point 37 is completed by the measure point, the conducting wall of the borehole in the region 40, the voltage source 39, the earth returns 51, the transducer housing 31, the resistive sheet 32, and the current feed 35. A similar closed loop circuit exists for the second measure point 38.

Current sensing transducers such as device 30 may be constructed with a variety of measure point configurations as well as a varying number of such measure points.

The low resistivity current feeds 35 and 36 may be made of copper bar, for example, and the resistive sheet may be made of stainless steel which preferably has a thickness within the range of about 10 to 20 mil (0.254 to 0.51 mm).

The transducer housing may be filled with a resin or oil to protect the components of current feed and toroidal coil therein, and in particular to support the housing and prevent it from collapsing under, or being damaged by, the high pressure which may occur at depth within a borehole.

In order to prevent the resistive sheet from wearing too rapidly on contact with the rock wall of the borehole, it may be provided with plates or strips of wear resistant material embedded in its outer face.

The foregoing disclosure and description of the invention is illustrative and explanatory thereof, and various changes may be made in the details of the illustrated apparatus without departing from the spirit of the invention.

What is claimed is:

1. Apparatus for electrically investigating formations along a well borehole which comprises:
   (a) a sheet of electrically resistive material having first and second opposed surfaces;
   (b) at least two elongate electrical conductors of a lower electrical resistivity material than said sheet to define an electrode array, said conductors each having an end face abutting said first surface of said sheet in electrical contact therewith; and
   (c) means for sensing electric current passing through each conductor;
   and wherein said second surface of said sheet is externally exposable to the formations along a well borehole to be investigated.

2. The apparatus according to claim 1 and which comprises a plurality of said electrical conductors each fixed in endwise abutment to a respective point on said first surface of said sheet, the said points being spaced to form a regular electrode array.

3. The apparatus according to claim 1 wherein the material of the sheet has an electrical resistivity at least ten times greater than that of the electrodes.

4. The apparatus according to 1 wherein the sheet material is selected from stainless steel, titanium, titanium alloy, electrically conductive rubber or electrically conductive plastics material.

5. The apparatus according to claim 1 wherein each of said conductors is a metal selected from the group consisting of copper, gold and silver.

6. The apparatus according to 5 wherein said conductors are copper wires soldered to a stainless steel sheet.

7. The apparatus according to claim 1 wherein said sheet forms a wall of a housing with said first surface internally of the housing.

8. An apparatus for investigating earth formations along a borehole penetrating the formations, the apparatus being adapted to move along the borehole axis, comprising:
   (a) a housing;
   (b) an array of electrical electrode conductors in the housing wherein said conductors are connected to a source of current enabling current flow from said electrode conductors through an end face;
   (c) means for sensing electric current flowing through each electrode conductor and into the borehole wall;
   (d) a continuous sheet of electrically conductive material forming part of the housing and said sheet is interposed between the end face of each electrode and the borehole wall, and wherein the conductivity of the electrode is greater than that of the sheet material.

9. The apparatus according to claim 8 wherein the housing is a closed housing in which the electrode conductor is supported.

10. The apparatus according to claim 8 wherein the housing is a closed housing which includes a filling material to withstand borehole pressures.

11. The apparatus according to claim 8 wherein the housing is a closed housing which includes a filler material selected from the group consisting of an oil, a resin or a silicone rubber.

12. The apparatus according to claim 8 which comprises a plurality of electrode conductors and wherein the current sensing means comprises a torodial coil for each of said conductors and said coils are connected to a current measuring device.

13. The apparatus according to claim 8 which comprises a plurality of said electrode conductors each fixed in endwise abutment to a respective point on said sheet and points are spaced to form a regular array.

14. The apparatus according to claim 8 wherein the material of the sheet has an electrical resistivity at least a factor of 10 greater than that of the electrode material.

15. The apparatus according to claim 8 wherein the sheet is formed of a material selected from the group consisting of stainless steel, titanium, titanium alloy, electrically conductive rubber and electrically conductive plastics material.

16. The apparatus according to claim 8 wherein the electrode conductor material is selected from the group consisting of copper, gold and silver.

17. The apparatus according to claim 13 wherein said conductor electrodes are termed of copper soldered to a stainless steel sheet.

18. The apparatus according to claim 8 wherein said sheet is a plate having strips of wear resistant material at the outer surface thereof.

* * * * *